(12) United States Patent
 Daniel

(10) Patent No.: US 9,022,872 B2
(45) Date of Patent: May 5, 2015

(54) DRIVE SHAFT COUPLING MECHANISM

(71) Applicant: Omni USA, Inc., Houston, TX (US)

(72) Inventor: Jeffrey K. Daniel, Houston, TX (US)

(73) Assignee: Omni USA, Inc., Houston, TX (US)

( * ) Notice: Subject to any disclaimer, the term of this patent is extended or adjusted under 35 U.S.C. 154(b) by 0 days.

(21) Appl. No.: 13/763,361

(22) Filed: Feb. 8, 2013

(65) Prior Publication Data

US 2014/0228133 A1   Aug. 14, 2014

(51) Int. Cl.
 *F16D 3/58* (2006.01)
 *F16D 3/16* (2006.01)
(52) U.S. Cl.
 CPC ........................................ *F16D 3/16* (2013.01)
(58) Field of Classification Search
 USPC .......... 464/73, 75, 88, 92, 136, 151, 153, 155
 See application file for complete search history.

(56) References Cited

U.S. PATENT DOCUMENTS

| | | | | |
|---|---|---|---|---|
| 617,869 | A | * | 1/1899 | Vanderbeek .................. 464/151 |
| 1,201,863 | A | * | 10/1916 | Obey |
| 1,270,602 | A | * | 6/1918 | Davis ............................ 464/151 |
| 1,697,065 | A | * | 1/1929 | James ............................. 464/75 |
| 2,004,299 | A | * | 6/1935 | Rush ............................... 464/75 |
| 2,083,338 | A | * | 6/1937 | Mancino et al. ............... 464/151 |
| 2,224,465 | A | * | 12/1940 | Wulfert ........................... 464/73 |
| 6,755,363 | B2 | * | 6/2004 | Weatherl et al. |
| 8,257,184 | B1 | * | 9/2012 | Cordes et al. ................... 464/73 |

* cited by examiner

*Primary Examiner* — Gregory Binda
(74) *Attorney, Agent, or Firm* — Haynes and Boone, LLP

(57) ABSTRACT

An in-line coupling device for a motor driven agricultural system utilizes less metal components while optimizing torque transfer. The device comprises a puck having a plurality of outwardly extending arms, a first shaft hub having outwardly extending flanges adapted to seat between a pair of the plurality of outwardly extending arms, and a second shaft hub having outwardly extending flanges adapted to seat between a pair of the outwardly extending arms.

20 Claims, 4 Drawing Sheets

DRIVE SHAFT COUPLING MECHANISM

FIELD OF THE INVENTION

The present invention relates generally to the field of power transmission for use in mechanized agricultural equipment, and more particularly to a coupler for coupling an in-line drive shaft to the wheel drive gearboxes that drive the wheels supporting and propelling an agricultural irrigation system.

BACKGROUND

In agricultural equipment such as irrigation systems, power mowers and the like, power is typically transferred through a gearbox from a power source, such as a motor or the PTO of a tractor, to the equipment. Typically, the drive motors or power input device has a round output shaft that is coupled to a square drive shaft of the gearbox of the equipment. In the agricultural industry, these square in-line drive shafts generally range from ¾" to 1" square.

As with other components of agricultural equipment, the couplers utilized to inter-connect the square drive shaft with the round output shaft are often subject to extreme operating conditions and environments. For example, common in such environments are hazards such as moisture, corrosive liquids including liquidized manure, the full range of soil and mineral conditions, insects and temperature extremes which could range from continental polar to equatorial. Likewise, because the terrain on which agricultural irrigation systems operate is often rocky, uneven and has varying surface conditions, such couplers are subject to high torque.

The standard prior art coupler consists of a rubber dampening puck sandwiched between two, two-piece collars. The dampening puck absorbs shock that could be transferred between the two collars and permits a degree of flexibility between the interconnected drive shafts. One collar, and in particular, the two mating halves of the collar, are disposed to fit around the round cross-section end of the output shaft of the drive motor while the other collar, and in particular, the two mating halves of the collar, are disposed to fit around the square cross-sectioned end of the input shaft. Each collar typically has one or more flanges that permit it to be bolted or attached to the flange of the other collar, with the dampening puck disposed between the adjacent flanges. Likewise, each collar half is disposed to engage the other collar half and secure to one another around the shaft utilizing standard fasteners, so that each collar has a compression fit around the shaft over which it is disposed. As mentioned above, the dampening puck is generally formed of rubber or other shock absorbing material such as polyurethane. The collars are generally formed of aluminum or similar metal cast to fit the specific drive shaft size and shape.

One drawback to these prior art couplers is that they have significant manufacturing costs, in that each collar half must be cast or otherwise formed and machined to the specifications of the particular coupling. Further, in order to provide a coupling that is sufficiently sturdy and rugged for the agricultural industry, the metal collar components typically require a comparatively large amount of material to form the collar sections.

Another drawback to the foregoing prior art coupling devices is that the fasteners clamping the two halves of a collar around a shaft may become loose over time, particularly under the vibrations of use, permitting the shaft to spin freely within the coupling. Not only could this result in a loss of power, but could also result in damage to the coupling, shafts, or equipment. Moreover, if the two halves were to completely separate, they could cause harm to nearby persons or equipment.

Thus, it would be desirable to provide a coupling with reduced manufacturing costs but with enhanced coupling ability.

SUMMARY OF THE INVENTION

These and other objects are achieved through a coupling device comprised of a first, single piece shaft hub disposed for mounting on the end of a round motor shaft, a second, two piece shaft hub disposed for mounting on the end of an input shaft, and a elastomeric puck disposed between the hubs. The elastomeric puck is formed of a cylindrical sleeve with four outwardly extending arms evenly spaced about the circumference of the sleeve. The first hub is formed of a single piece having a cylindrical sleeve with two opposing flanges projecting out from opposite sides of the sleeve. Each flange seats between two adjacent arms of the puck, thereby engaging the puck relative to the first shaft hub. The second hub is formed of two elongated brackets. Each bracket has a flange which also seats between two adjacent arms of the puck, thereby engaging the puck relative to the second shaft hub.

DESCRIPTION OF ILLUSTRATIVE EMBODIMENTS

Illustrative embodiments and related methodologies of the present invention are described below as they might be employed in a drive shaft coupling mechanism. In the interest of clarity, not all features of an actual implementation or methodology are described in this specification. For example, various equipment components, such as fasteners, fittings, etc., may be omitted to simplify the description; however, those ordinarily skilled in the art will realize that such equipment can be employed as desired. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the invention will become apparent from consideration of the following description and drawings.

Figure 1:
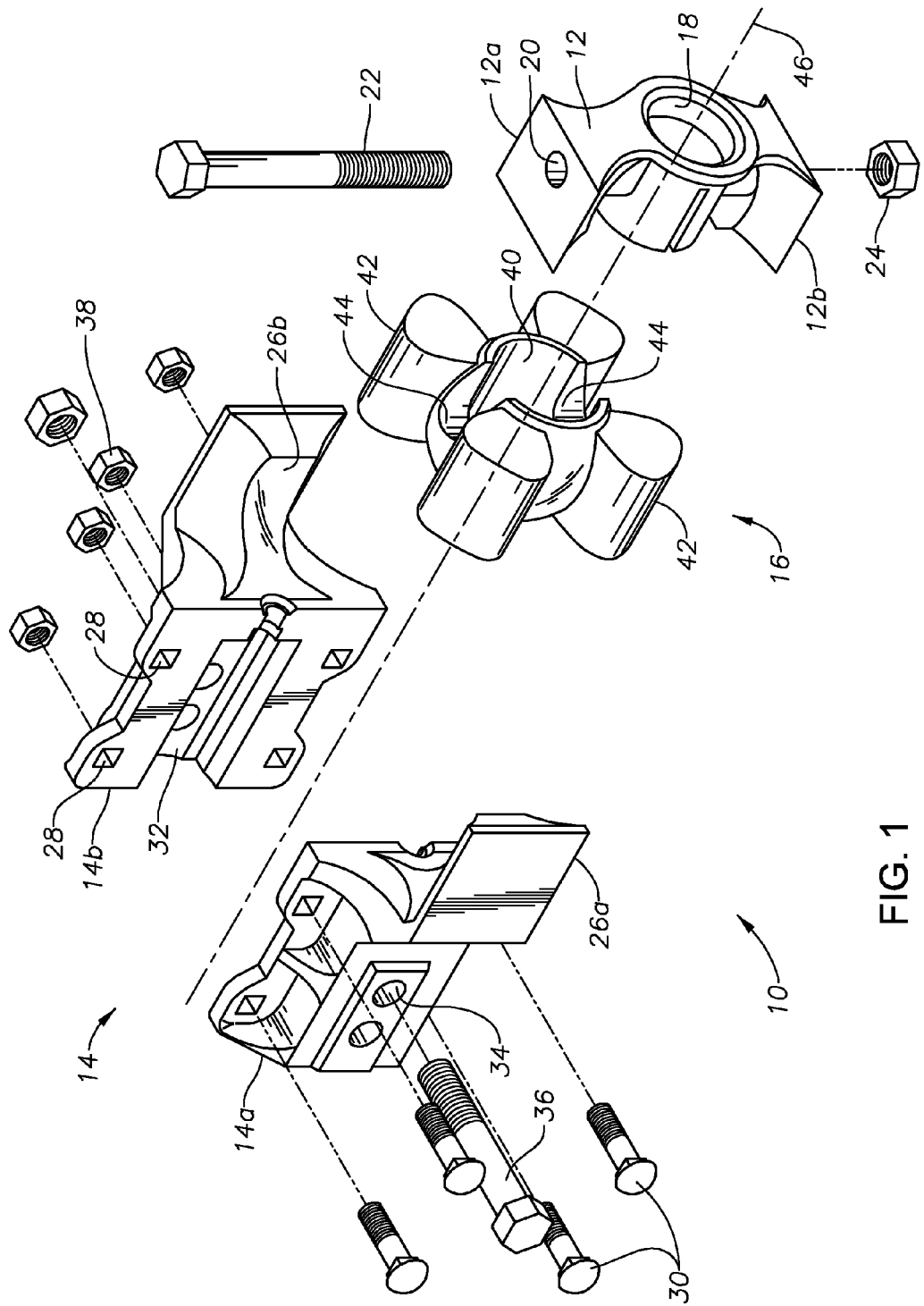
FIG. 1 illustrates the various components forming part of a coupling device according to certain exemplary embodiments of the present invention.

With reference to FIG. 1, the components of a coupling device 10 are illustrated according to an exemplary embodiment of the present invention. Coupling device 10 comprises a motor shaft hub 12 disposed for attachment to the round shaft (not shown) of a drive motor (not shown), a puck 16, and an input shaft hub 14. As will be described in more detail below, input shaft 14 is positioned on one side of puck 16, while motor shaft hub 12 is positioned on the opposing side of puck 16.

Figure 7:
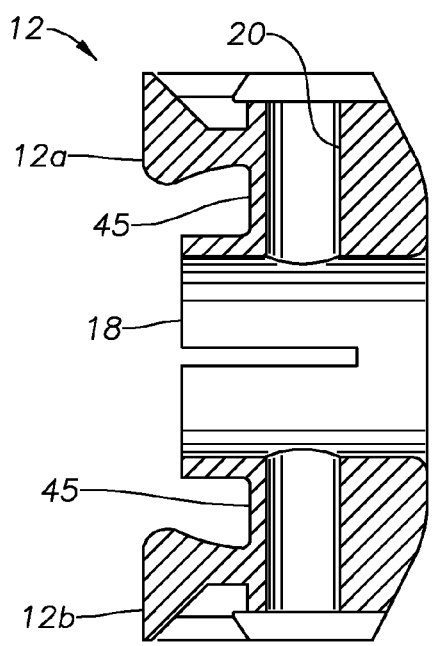
FIG. 7 illustrates a sectional view of a motor shaft hub of a coupling device according to certain exemplary embodiments of the present invention.

Motor shaft hub 12, also illustrated in FIG. 7, is a single-piece component having a cylindrical sleeve 18 defined along an axis 46 and two opposing flanges 12a and 12b extending outwardly from cylindrical sleeve 18. Sleeve 18 defines a bore 20 extending at least partially through shaft hub 12. In certain exemplary embodiments, bore 20 extends entirely through hub 12, while in other embodiments, cylindrical sleeve 18 may be enclosed at one end. A shoulder, spline or similar alignment structure 45 may be defined on sleeve 18 or one or more flanges 12 that can be used to engage puck 16 as described below. A coupler such as, for example, a bolt 22, is disposed to seat in shaft hub 12 so as to pass through sleeve 18 and bore 20, thereby engaging a motor shaft (not shown) disposed within bore 20. In certain embodiments, coupler 22 may also engage puck 16. Coupler 22 is secured in place using a nut 24 which may be, for example, a self-locking nut. Coupler 22 prevents puck 16 from separating from coupling device 10 under high stress. While coupler 22 is described as a bolt for engaging a nut, persons of ordinary skill in the art will appreciate that coupler 22 could include other types of fasteners, such as a pin or similar device. In certain preferred embodiments, hub 12 is formed of cast aluminum.

An input shaft hub 14 is positioned at the opposite end of the coupling device 10 in order to receive an input shaft such as, for example, a drive gear box shaft (not shown). Input shaft hub 14 is comprised of two elongated brackets 14a and 14b which, when coupled together, form a seat 32 to receive the gear box shaft. Seat 32 may be any variety of shaped. In certain embodiments, seat 32 may be shaped to prevent relative rotational movement between shaft hub 14 and a drive gear box shaft. For example, as illustrated, seat 32 may be square in shape to form a notch as will be understood by those ordinarily skilled in the art having the benefit of this disclosure. At the first end of input shaft hub 14, elongated brackets 14a and 14b comprise a plurality of bores 28 to receive coupler 30 such as, for example, bolts. To the extent seat 32 is shaped so as to prevent relative rotation of hub 14 with respect to drive gear box shaft, then additional fasteners are not necessary to secure hub 14 to the drive gear box shaft. In other embodiments, such as for example, if seat 32 is round and drive gear box shaft is round, it may be necessary to utilize additional fasteners to secure hub 14 to the drive gear box shaft in order to prevent relative rotation therebetween. In one such configuration, additional bores 34 also may extend through seat 32 in order to receive a coupler 36. Once the input shaft has been mounted inside seat 32, coupler 36 will be inserted through one of the bores 34 where it will be secured using nut 38. In any event, those ordinarily skilled in the art having the benefit of this disclosure realize that more or fewer couplers 30, 36 may be utilized as desired. Multiple bores 34 may be provided to allow flexibility to mount gear box shafts having varying lengths. Thereafter, nuts 38 such as, for example, a locking nut, will be utilized to secure the coupler 30, 36 in place. While couplers 30, 36 are described as bolts for engaging nuts, persons of ordinary skill in the art will appreciate that couplers 30, 36 could include other types of fasteners, such as a pin or similar device. In certain preferred embodiments, hub 14 is formed of cast aluminum.

Still referring to the exemplary embodiment of FIG. 1, elongated brackets 14a and 14b each include L-shaped flanges 26a and 26b, respectively, at their ends. Flanges 26a,b are adapted to mate with a puck 16 which is positioned between input shaft hub 14 and motor shaft hub 12. As will be understood by those ordinarily skilled in the art having the benefit of this disclosure, puck 16 may be comprised of a variety of shock absorbing materials such as, for example, polyurethane, rubber or some other elastomeric material. Referring also to the exemplary puck illustrated in FIG. 2, puck 16 comprises a cylindrical sleeve 40 at its center, with outward extensions 42, such as four outwardly extending arms evenly spaced about the circumference of cylindrical sleeve 40.

Figure 5:
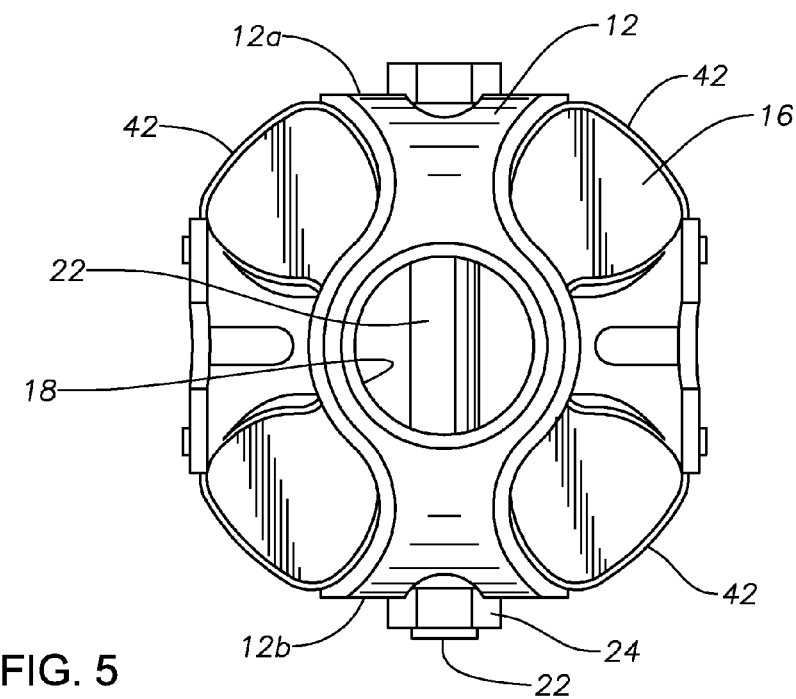
FIG. 5 illustrates the face of the motor shaft end of an assembled coupling device according to certain exemplary embodiments of the present invention.

Upon assembly of coupling device 10, flanges 26a,b seat between a pair of arms 42 of puck 16, while flanges 12a,b of hub 12 also seat between a pair of arms 42, thus forming a "cross" shape best illustrated in FIG. 5. In certain embodiments, an aperture 44 may be defined in cylindrical sleeve 40 at opposing locations between two sets of arms 42. In certain embodiments, aperture 44 may be a notch that is shaped or adapted to receive or mate with an alignment structure 45 of motor shaft hub 12 (FIG. 7) once coupling device 10 is assembled, thereby inhibiting axial rotation of puck 16 relative to hub 12. In another embodiment, another embodiment in which an alignment structure 45 is not present, aperture 44 may simply be a hole thereby permitting fastener 22 to pass through puck 16. In any event, when assembled, cylindrical sleeve 18 will be positioned along the inner diameter of cylindrical sleeve 40. Those persons of ordinary skill in the art will appreciate that while puck 16 has been described and illustrated with four outward extensions 42 in one preferred embodiment, other embodiments may have more or fewer extensions. For example, puck 16 may have only two arms or may have six arms. In addition, with reference to FIG. 1, two adjacent arms may be formed into a single outward extension that seats between flanges 12a, b, thereby enhancing the strength of extensions 42, but molded to engage L-shaped flanges 26a and 26b.

Figure 2:
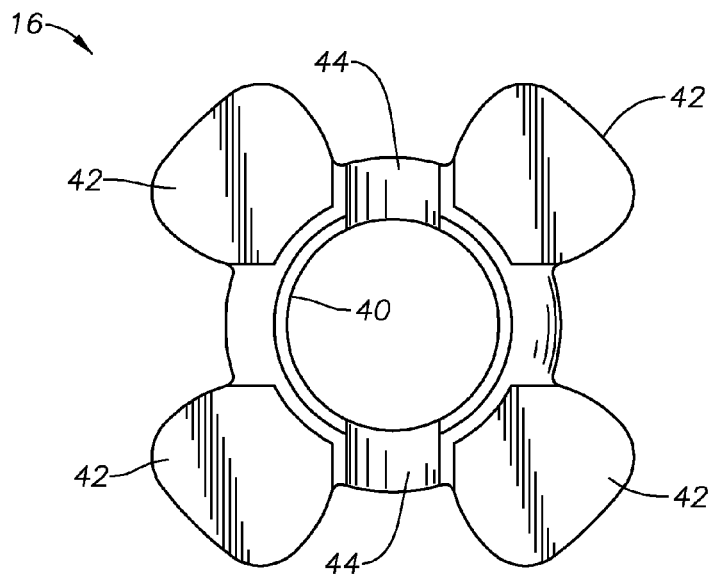
FIG. 2 illustrates an elastomeric puck according to certain exemplary embodiments of the present invention.
Figure 3:
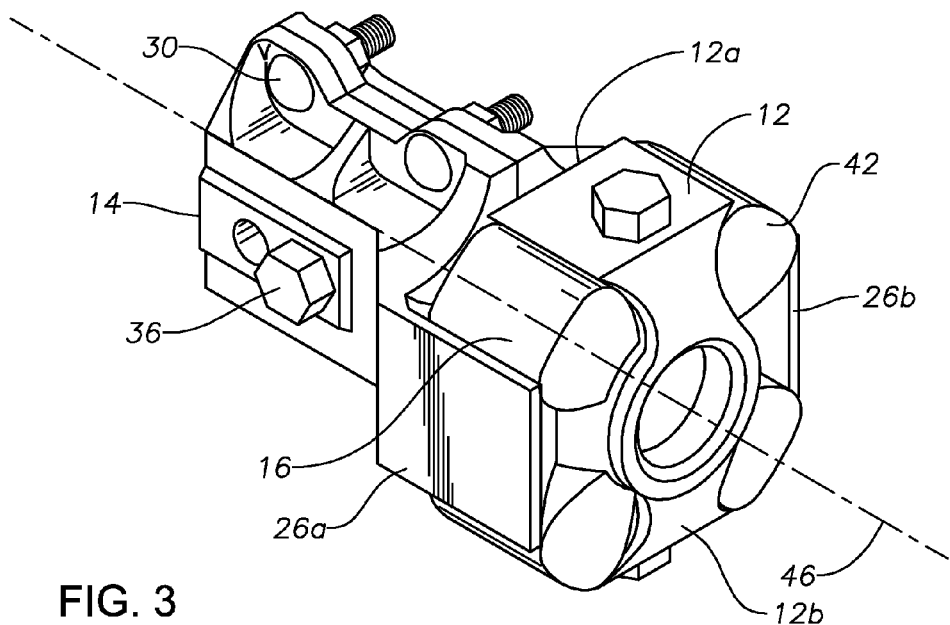
FIG. 3 illustrates an assembled coupling device according to certain exemplary embodiments of the present invention.
Figure 4:
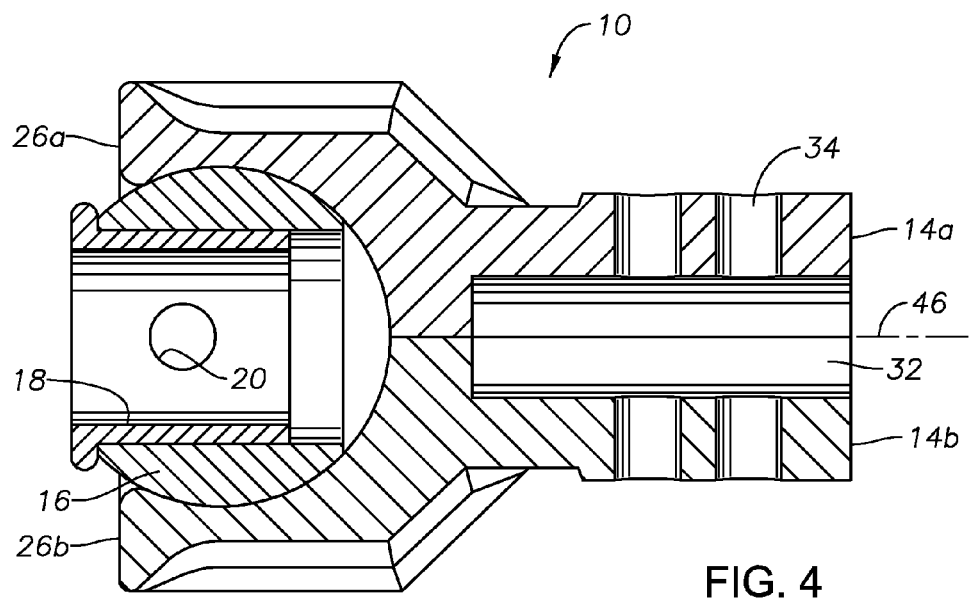
FIG. 4 illustrates a sectional view of an assembled coupling device according to certain exemplary embodiments of the present invention.

FIG. 3 shows an assembled coupling device 10. Referring now to FIGS. 1-3, assembly of coupling device 10 will now be described. Coupling device 10 is characterized by a reference axis 46 extending axially through the center of input shaft hub 14, puck 16 and motor shaft hub 12, as shown in FIGS. 1, 3 and 4. When assembled, puck 16 is positioned between input hub 16 and motor shaft hub 12. As shown in FIG. 5 (which illustrates the face of hub 12), opposing flange 12a of motor shaft hub 12 seats between the upper set of arms 42, while flange 12b seats between the lower set of arms 24. Cylindrical sleeve portion 18 fits inside cylindrical sleeve 40 of puck 16 (FIG. 4), while notches 44 also mate with flanges 12a and 12b. L-shaped flanges 26 of input shaft hub 14 are positioned to the left and right of cylindrical sleeve 40 between an upper and lower arm 42. Elongated brackets 14a and 14b are coupled together using one or more couplers 30, thus forming seat 32 (FIG. 6) in which the input shaft will be mounted. In the illustrated embodiment, seat 32 is notched to prevent relative rotational movement of hub 14 on the shaft.

Figure 6:
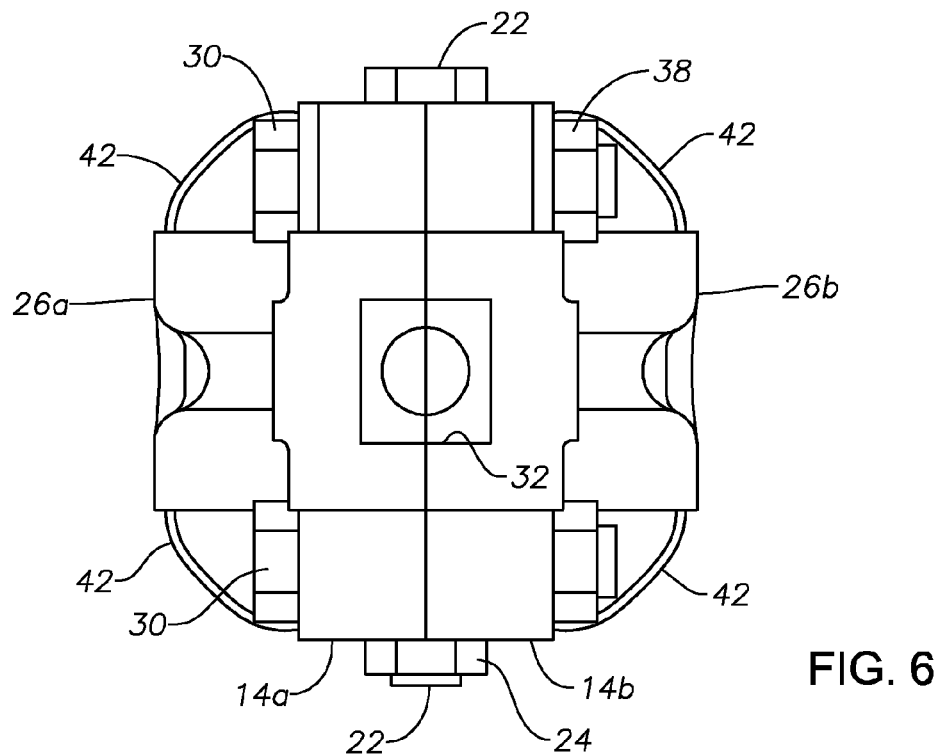
FIG. 6 illustrates the face of the input shaft end of an assembled coupling device according to certain exemplary embodiments of the present invention.

Once coupling device 10 has been assembled as shown in FIG. 6, the input and motor shafts (not shown) are secured in their respective positions. In this exemplary embodiment, coupling device 10 does not hold the input and motor shafts axially in place along axis 46. Rather, coupling device 10 prevents radially movement between the shafts and coupling device 10 through utilization of the couplers 22 and 36. In operation, once the motor shaft (not shown) begins to turn, torque is transferred to shaft hub 12 via coupler 22, which in turn transfers the torque to puck 16. Here, flanges 12a and 12b of hub 12 also work to transfer the torque to puck 16, whereby the torsional load is absorbed and the torque is then transferred to flanges 26a and 26b of input hub 14, and onto the input shaft.

Accordingly, the exemplary embodiments described herein results in a coupling device that utilizes less metal (aluminum, for example), thus resulting in lower production costs and weight than prior art devices. In addition, the "cross" shaped coupling around the puck transmits more torque than prior art devices.

An exemplary embodiment of the present invention provides a coupling device for in-line coupling of a first and second shaft in a motor driven agricultural system, the coupling device comprising a puck having a puck sleeve characterized by a first and second end; a plurality of arms extending from the puck sleeve; and a first and second aperture formed in the first end of the puck sleeve. The device further comprises a first shaft hub adapted to mate within the first and second notches of the puck sleeve, the first shaft hub comprising first and second outwardly extending flanges; a second shaft hub positioned adjacent the second end of the puck opposite the first shaft hub, the second shaft hub comprising a first and second flange adapted to seat within the plurality of arms extending from puck sleeve; and a coupler extending through the first shaft hub and the puck.

Another exemplary embodiment of the present invention provides a coupling device for in-line coupling of a first and second shaft in a motor driven agricultural system, the coupling device comprising a puck having a puck sleeve and a plurality of arms extending therefrom; a first shaft hub positioned at a first side of the puck, the first shaft hub comprising first and second outwardly extending flanges adapted to seat between a pair of the plurality of arms extending from the puck sleeve; and a second shaft hub positioned on a second side of the puck opposite the first shaft hub, the second shaft hub comprising a first and second flange adapted to seat between a pair the plurality of arms extending from puck sleeve.

Yet another exemplary embodiment of the present invention provides a coupling device for in-line coupling of a first and second shaft in a motor driven agricultural system, the coupling device comprising a puck having a plurality of outwardly extending arms; a first shaft hub comprising outwardly extending flanges adapted to seat between a pair of the plurality of outwardly extending arms; and a second shaft hub comprising outwardly extending flanges adapted to seat between a pair of the outwardly extending arms.

Although various embodiments and methodologies have been shown and described, the invention is not limited to such embodiments and methodologies and will be understood to include all modifications and variations as would be apparent to one skilled in the art. Therefore, it should be understood that the invention is not intended to be limited to the particular forms disclosed. Rather, the intention is to cover all modifications, equivalents and alternatives falling within the spirit and scope of the invention as defined by the appended claims.

What is claimed is:

1. A coupling device for in-line coupling of a first and second shaft in a motor driven agricultural system, the coupling device comprising:
   a puck, comprising:
      a puck sleeve characterized by a first and second end;
      a plurality of arms extending from the puck sleeve; and
      a first and second aperture formed in the first end of the puck sleeve;
   a first shaft hub adapted to mate with the first and second apertures of the puck sleeve, the first shaft hub comprising first and second outwardly extending flanges;
   a second shaft hub positioned adjacent the second end of the puck opposite the first shaft hub, the second shaft hub comprising first and second flanges adapted to seat within the plurality of arms extending from puck sleeve; and
   a coupler extending through the first shaft hub and the puck.

2. A coupling device as defined in claim 1, wherein the first shaft hub further comprises at least one alignment structure, wherein at least one of the first or second puck apertures is a notch that engages the alignment structure.

3. A coupling device as defined in claim 1, wherein the first shaft hub further comprises a sleeve adapted to mate along an inner diameter of the puck sleeve.

4. A coupling device as defined in claim 1, wherein the puck is formed of an elastomeric material.

5. A coupling device as defined in claim 1, wherein the puck comprises four arms evenly spaced about the puck sleeve.

6. A coupling device as defined in claim 5, wherein the first and second flanges of the first shaft hub each seat between two adjacent arms of the puck.

7. A coupling device as defined in claim 6, wherein the first and second flanges of the second shaft hub each seat between two adjacent arms of the puck.

8. A coupling device for in-line coupling of a first and second shaft in a motor driven agricultural system, the coupling device comprising:
   a puck comprising a puck sleeve and a plurality of arms extending therefrom;
   a first shaft hub positioned at a first side of the puck, the first shaft hub comprising first and second outwardly extending flanges adapted to seat between a pair of the plurality of arms extending from the puck sleeve;
   a second shaft hub positioned on a second side of the puck opposite the first shaft hub, the second shaft hub comprising first and second flanges adapted to seat between a pair the plurality of arms extending from puck sleeve; and
   a coupler extending through the first shaft hub and the puck, wherein the coupler traverses an axis of the first shaft hub and the puck.

9. A coupling device as defined in claim 8, wherein the puck sleeve further comprises a first and second notch positioned along a first side of the puck sleeve, the first and second notches being adapted to receive the first shaft hub.

10. A coupling device as defined in claim 8, wherein the first shaft hub further comprises a sleeve adapted to mate along an inner diameter of the puck sleeve.

11. A coupling device as defined in claim 8, wherein the puck is formed of an elastomeric material.

12. A coupling device as defined in claim 8, wherein the puck comprises four arms evenly spaced about the puck sleeve.

13. A coupling device as defined in claim 12, wherein the first and second flanges of the first shaft hub each seat between two adjacent arms of the puck.

14. A coupling device as defined in claim 13, wherein the first and second flanges of the second shaft hub each seat between two adjacent arms of the puck.

15. A coupling device for in-line coupling of a first and second shaft in a motor driven agricultural system, the coupling device comprising:
- a puck comprising a plurality of outwardly extending arms;
- a first shaft hub comprising outwardly extending flanges adapted to seat between a pair of the plurality of outwardly extending arms, the first shaft hub further comprising a sleeve adapted to mate along an inner diameter of a sleeve of the puck;
- a second shaft hub comprising outwardly extending flanges adapted to seat between a pair of the outwardly extending arms; and
- a coupler extending through the first shaft hub and the puck, wherein the coupler traverses an axis of the first shaft hub and the puck.

16. A coupling device as defined in claim 15, wherein the puck further comprises:
- a puck sleeve; and
- a first and second notch positioned along a first side of the puck sleeve, the first and second notches being adapted to receive the first shaft hub.

17. A coupling device as defined in claim 15, wherein the puck is formed of an elastomeric material.

18. A coupling device as defined in claim 15, wherein the puck comprises four arms evenly spaced about the sleeve of the puck.

19. A coupling device as defined in claim 15, wherein the outwardly extending flanges of the first shaft hub each seat between two adjacent arms of the puck.

20. A coupling device as defined in claim 19, wherein the outwardly extending flanges of the second shaft hub each seat between two adjacent arms of the puck.

* * * * *